(12) United States Patent
Watanabe et al.

(10) Patent No.: US 7,474,525 B2
(45) Date of Patent: Jan. 6, 2009

(54) ELECTRONIC DEVICE

(75) Inventors: Kiyoshi Watanabe, Ome (JP); Hiroaki Aikyo, Hamura (JP); Hideo Imai, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 11/981,905

(22) Filed: Nov. 1, 2007

(65) Prior Publication Data

US 2008/0123286 A1    May 29, 2008

(30) Foreign Application Priority Data

Jan. 12, 2006    (JP)    ............................ P2006-325217

(51) Int. Cl.
*G06G 1/16*    (2006.01)
(52) U.S. Cl. ...................... 361/686; 361/683; 429/96; 429/100
(58) Field of Classification Search ......... 361/679–686; 312/223.1, 223.2; 429/96–100
See application file for complete search history.

(56) References Cited

U.S. PATENT DOCUMENTS

| | | | | |
|---|---|---|---|---|
| 5,455,737 A | * | 10/1995 | Ogami et al. ............... | 361/680 |
| 5,506,749 A | * | 4/1996 | Matsuda ..................... | 361/683 |
| 5,619,397 A | * | 4/1997 | Honda et al. ................ | 361/686 |
| 5,949,643 A | * | 9/1999 | Batio .......................... | 361/681 |
| 5,996,956 A | * | 12/1999 | Shawver .................. | 248/309.1 |
| 6,625,011 B2 | * | 9/2003 | Hyun .......................... | 361/680 |
| 6,976,799 B2 | * | 12/2005 | Kim et al. .................... | 400/472 |
| 7,016,184 B1 | * | 3/2006 | Oneyama et al. ........... | 361/683 |
| 7,349,001 B2 | * | 3/2008 | Huang et al. ................ | 345/169 |
| 2004/0145866 A1 | * | 7/2004 | Lilenfeld .................... | 361/686 |
| 2005/0090206 A1 | * | 4/2005 | Hyun et al. ................ | 455/90.3 |

FOREIGN PATENT DOCUMENTS

JP    2002-216729 A    8/2002

* cited by examiner

*Primary Examiner*—Jayprakash N Gandhi
*Assistant Examiner*—Anthony Q Edwards
(74) *Attorney, Agent, or Firm*—Frishauf, Holtz, Goodman & Chick, P.C.

(57) ABSTRACT

A clamshell type electronic device includes: a first case; a second case; a hinge portion that rotatably couples the first case and the second case to be foldable; a battery chamber that is provided in the hinge portion for accommodating a battery; a battery cover that covers the battery chamber; and a stylus holder that is provided on an inner face of the battery cover for accommodating a stylus to be removable therefrom by drawing out the stylus from the stylus holder.

6 Claims, 10 Drawing Sheets

ELECTRONIC DEVICE

CROSS-REFERENCE TO THE RELATED APPLICATION(S)

The present application is based upon and claims priority from prior Japanese Patent Application No. 2006-325217, filed on Dec. 1, 2006, the entire content of which are incorporated herein by reference.

TECHNICAL FIELD

The present invention relates to an electronic device, such as an electronic dictionary, an electronic notebook, an electronic calculator, a mobile telephone, and a personal digital assistant (PDA) device.

BACKGROUND

Conventionally, among electronic devices, such as PDA devices, there is known a clamshell type device that is configured such that first and second cases are rotatably coupled by a hinge portion. When the clamshell type electronic device is to be carried, the device is closed by rotating the first and second cases about the hinge portion. The device is opened by rotating the first and second cases about the hinge portion when in use.

In order to minimize the overall size of the device, there is proposed to configure such a clamshell type electronic device, as described in JP-A-2002-216729, such that a battery chamber is provided in the hinge portion that rotatably couples the first and second cases, and batteries are accommodated in the battery chamber.

However, in such a conventional clamshell type electronic device, since the battery chamber is provided in the hinge portion that rotatably couples the first and second cases to merely accommodate batteries, a space in the battery chamber is not effectively used. For example, in the case where a clamshell type electronic device requires input operation using a stylus, a stylus holder for accommodating the stylus is required in addition to the battery chamber. The stylus holder is generally provided in outer peripheral surfaces of the first and second cases such as side surfaces or front surfaces thereof.

In such a clamshell type electronic device, since the stylus holder for accommodating the stylus is provided at a portion separate from the battery chamber, there are problems in that not only the overall device cannot be made sufficiently compact, but the external appearance of the overall device is impaired by the stylus holder provided in the outer peripheral surfaces of the first and second cases such as side surfaces or front surfaces thereof.

SUMMARY

One of objects of the present invention is to provide an electronic device that is capable of minimizing the overall size of the device without impairing the external appearance of the device while being provided with a stylus holder.

According to one aspect of the invention, there is provided a clamshell type electronic device including: a first case; a second case; a hinge portion that rotatably couples the first case and the second case to be foldable; a battery chamber that is provided in the hinge portion for accommodating a battery; a battery cover that covers the battery chamber; and a stylus holder that is provided on an inner face of the battery cover for accommodating a stylus to be removable therefrom by drawing out the stylus from the stylus holder.

DETAILED DESCRIPTION

Referring now to FIGS. 1-8, a description will be given of an embodiment in which the present invention is applied to an electronic dictionary.

Figure 1:
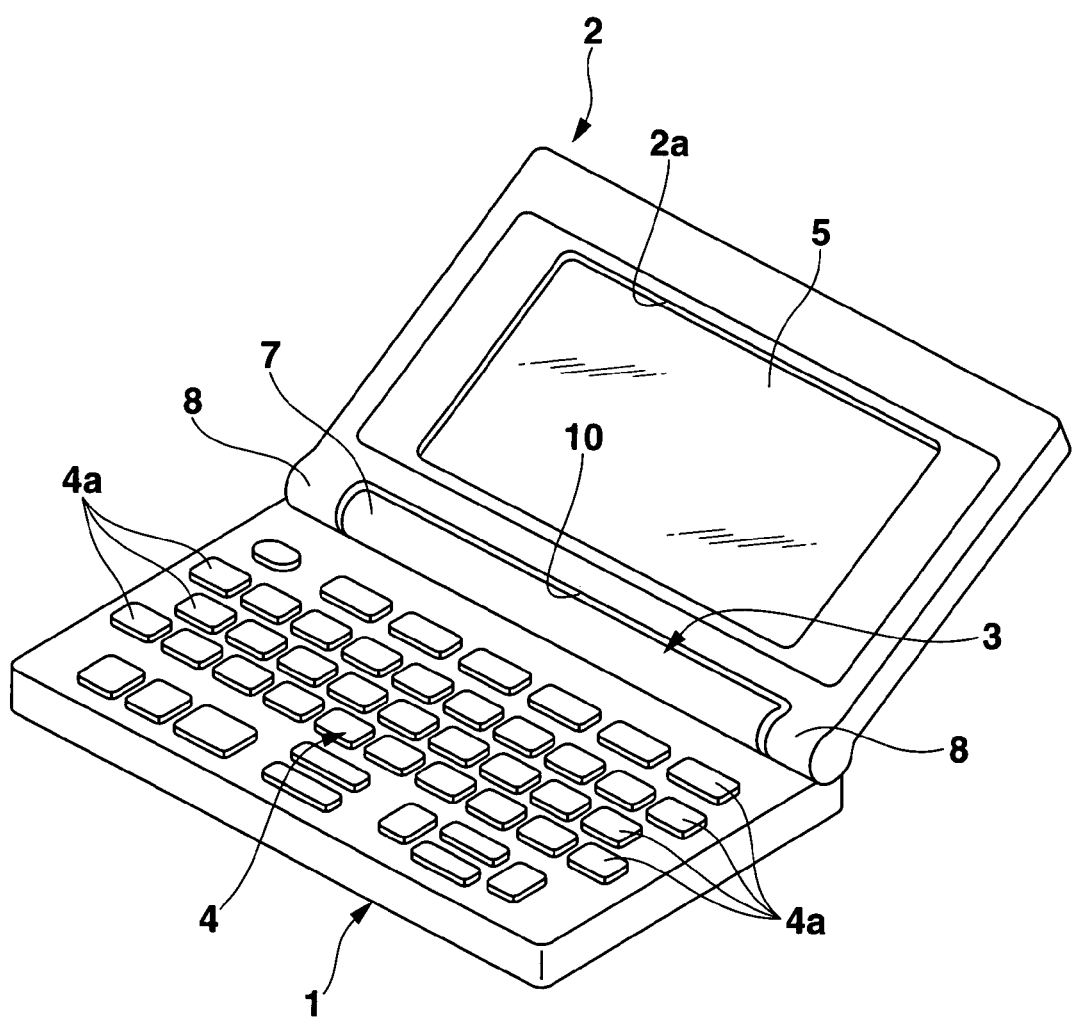
FIG. 1 is a perspective view illustrating an embodiment in which the invention is applied to an electronic dictionary.

FIG. 1 is a perspective view illustrating a state in which the electronic dictionary according to the embodiment is opened to be in use.

The electronic dictionary is of a clamshell type in which a first case 1 and a second case 2 are rotatably coupled by a hinge portion 3. The first and second cases 1 and 2 are formed into flat-box shapes having substantially the same size. The first and second cases 1 and 2 overlap one another when they are closed by being rotated about the hinge portion 3.

As shown in FIG. 1, the first case 1 is provided with a key input section 4, and the second case 2 is provided with an input display section 5. The key input section 4 of the first case 1 has various keys 4a including character keys, function keys, and cursor keys, for allowing a user to input operation for using a dictionary function provided by the electronic dictionary.

The input display section 5 of the second case 2 serves a display function and a touch input function, and a transparent touch panel is laminated on a surface of a display panel. The touch panel is exposed from an opening 2a of the second case 2, as shown in FIG. 1. The display panel of the input display section 5 is of a flat surface type display device, such as a liquid crystal display panel, or an electroluminescence (EL) display panel. The display panel of the input display section 5 electro-optically displays information to be displayed by the dictionary function in accordance with the command input through the key input section 4 and handwritten information input through the touch panel. The transparent touch panel is touch-operated by a stylus 6, which will be described later.

As shown in FIG. 1, the hinge portion 3 includes a first hinge portion 7 provided on the first case 1 and a pair of second hinge portions 8 provided on the second case 2. The first and second hinge portions 7 and 8 are rotatably coupled by a pair of hinge shafts 9 shown in FIG. 2.

The first hinge portion 7 is formed on an intermediate portion of a rear-end edge (along an edge on the back side in FIG. 1) of the first case 1 in such a manner as to protrude in a substantially semicylindrical shape upwardly from the upper surface of the first case 1. The second hinge portions 8 are respectively formed on both left and right side portions of rear-end edge (along an edge on the front side in FIG. 1) of the second case 2 in such a manner as to protrude in a substantially semicylindrical shape toward the front side of the second case 2. In the case, the first hinge portion 7 is formed to be sufficiently longer than the second hinge portions 8. As shown in FIG. 1, a notched recess 10, into which the first hinge portion 7 is inserted, is provided in an intermediate portion of the rear-end edge of the second case 2 by the second hinge portions 8 provided on the left and right thereof.

The first hinge portion 7 of the first case 1 is disposed by being inserted in the notched recess 10 of the second case 2, and is rotatably coupled by the hinge shafts 9. The hinge shafts 9 have their one ends respectively fixed to end faces on both sides of the first hinge portion 7.

Figure 2:
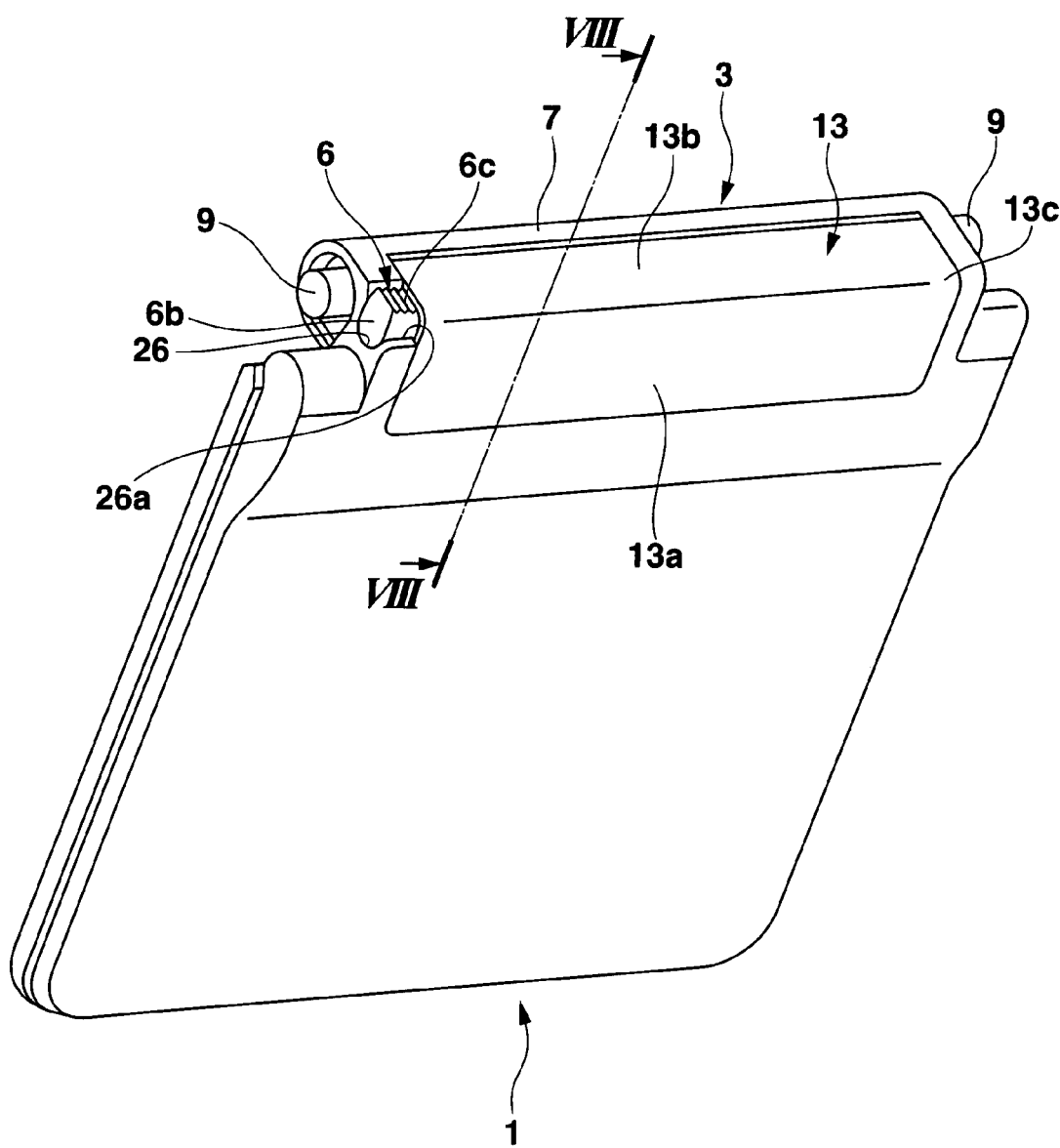
FIG. 2 is a perspective view illustrating a lower surface side of a first case shown in FIG. 1.
Figure 3:
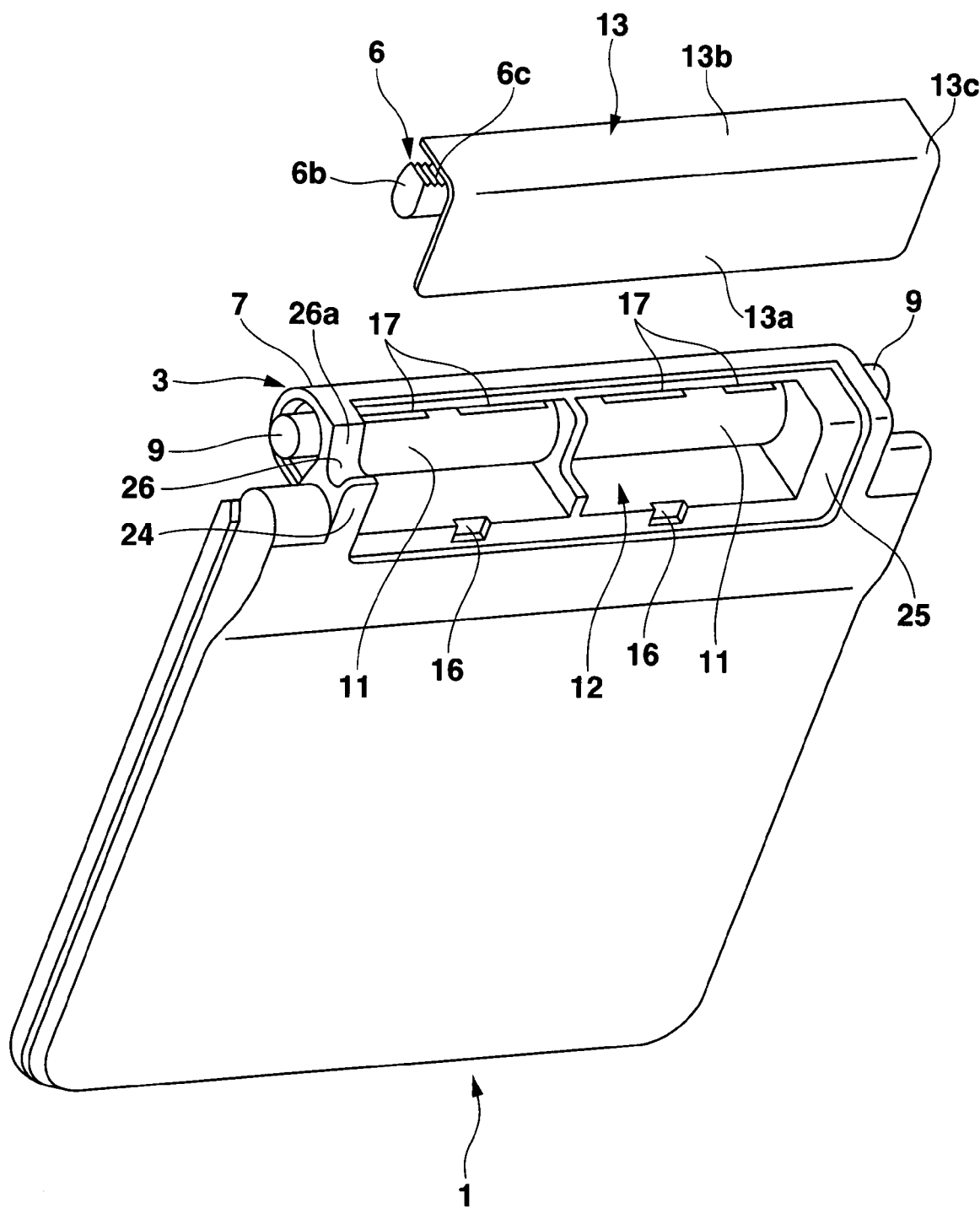
FIG. 3 is a perspective view of the lower surface side of the first case and illustrates a state in which a battery cover shown in FIG. 2 is opened.

As shown in FIGS. 2 and 3, the hinge portion 3 is provided with a battery chamber 12 for accommodating batteries 11. The battery chamber 12 is provided in such a manner as to extend from a bottom portion of the first case 1 at a portion corresponding to the first hinge portion 7 to an interior of the first hinge portion 7, and a battery cover 13 is detachably mounted in an open space of the battery chamber 12. In the embodiment, it is assumed that the batteries 11 are cylindrical dry batteries. The battery chamber 12 is configured as an elongated space in which the two batteries 11 are disposed in series.

As shown in FIGS. 2 and 3, the battery cover 13 is detachably fitted in such a manner as to extend from a rear surface of the first hinge portion 7 to a lower surface of the first case 1 to close the opening of the battery chamber 12. Namely, the battery cover 13 includes a bottom face 13a for covering and closing the opening on the bottom surface side of the battery chamber 12, as well as a rear face 13b for covering and closing the opening on the rear surface side of the battery chamber 12. The bottom face 13a and the rear face 13b are monolithically formed substantially in an L-lettered shape by being connected by curved portion 13c, which is convex toward the outer side.

Figure 4:
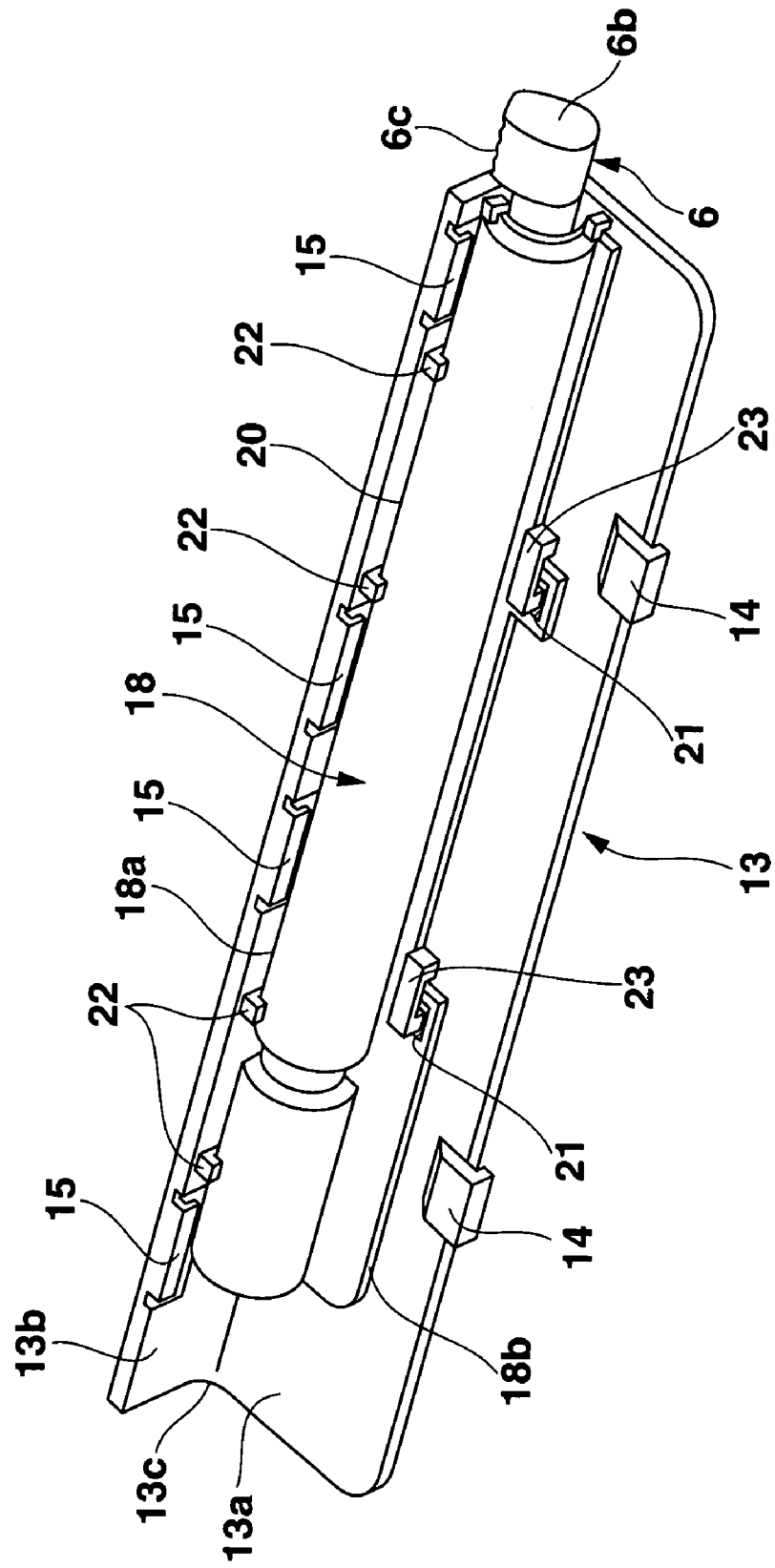
FIG. 4 is an enlarged perspective view of an inner face side and illustrates the battery cover shown in FIG. 3.
Figure 5:
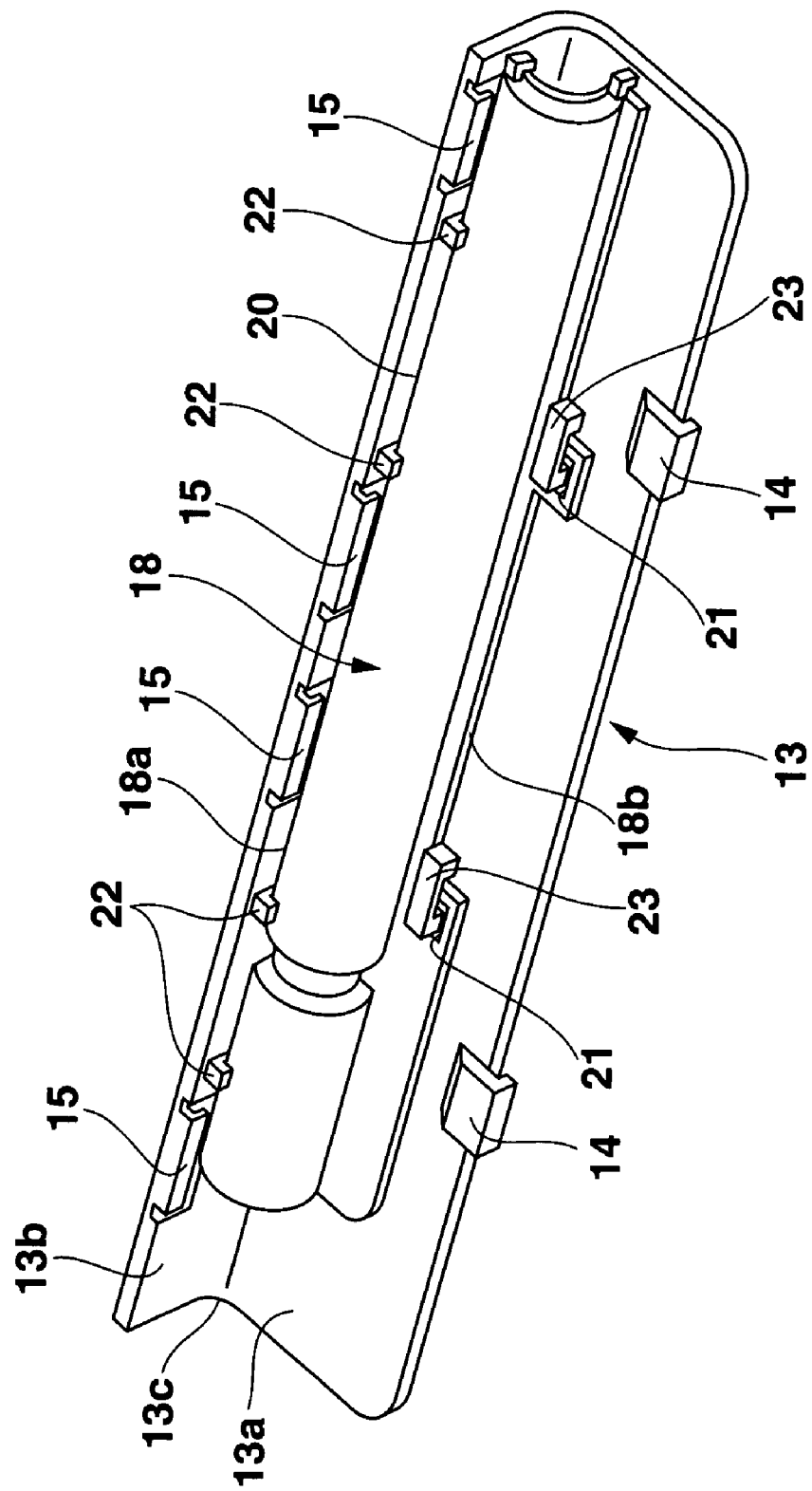
FIG. 5 is an enlarged perspective view of the inner face side of the battery cover and illustrates a state in which a stylus is removed from a stylus holder provided on the battery cover shown in FIG. 4.
Figure 6:
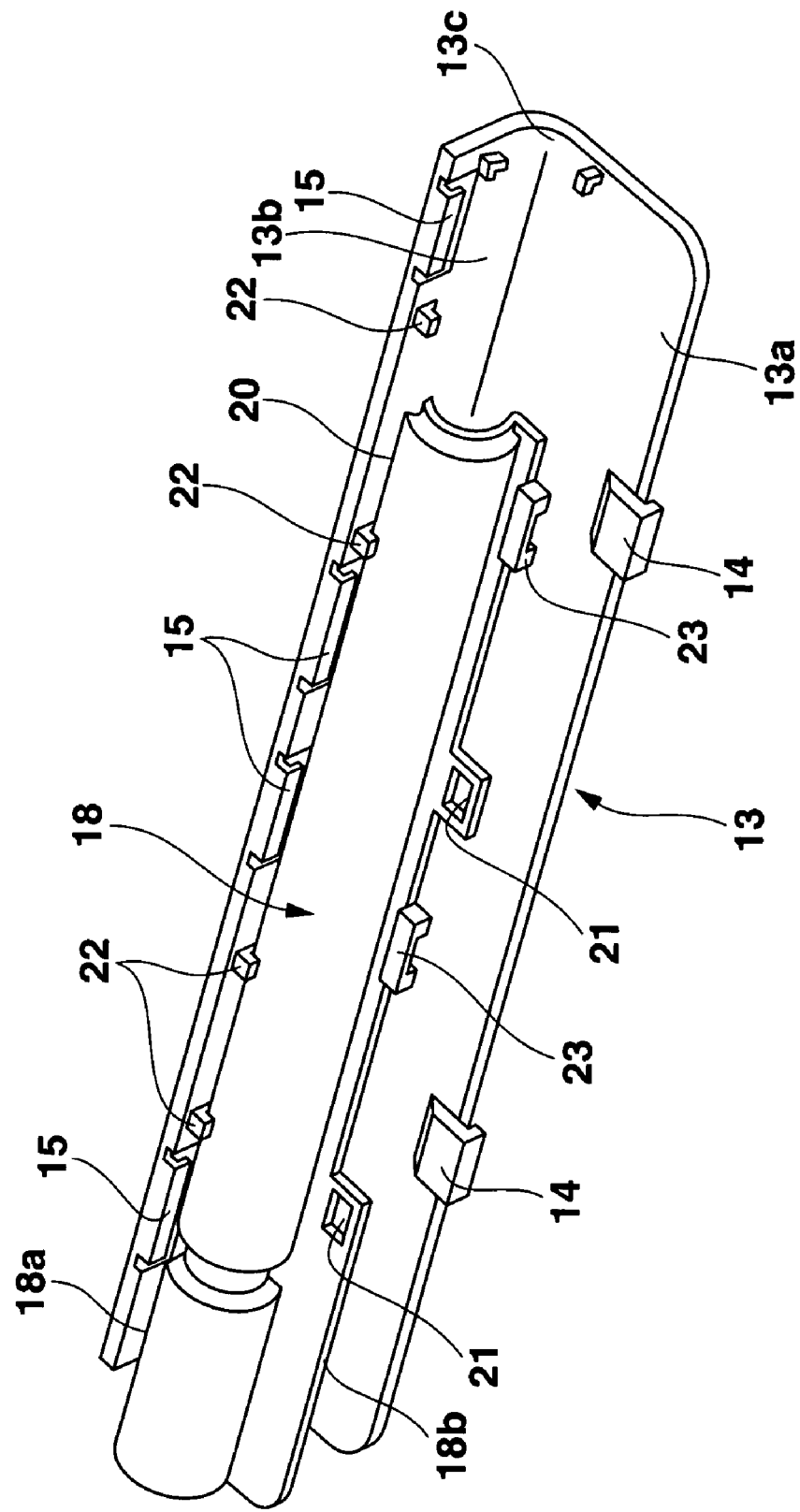
FIG. 6 is an enlarged perspective view of the inner face side of the battery cover and illustrates a state in which the stylus holder is mounted on the inner face of the battery cover shown in FIG. 5.

In the embodiment, as shown in FIGS. 4-6, engaging projections 14 are formed on the bottom face 13a of the battery cover 13 in such a manner as to project forward (toward the side in FIG. 4), and a plurality of engaging hooks 15 are provided at an upper inner end portion in the rear face 13b of the battery cover 13. Meanwhile, as shown in FIG. 3, retaining holes 16, in which the engaging projections 14 of the battery cover 13 are engaged, are provided in the bottom portion of the first case 1 located in the battery chamber 12 corresponding to the battery cover 13. A plurality of retaining portions 17 for respectively retaining the plurality of engaging hooks 15 of the battery cover 13 are provided at edge portions on the rear surface side in the battery chamber 12.

When the battery cover 13 is slid from the rear surface side of the first case 1 such that the bottom face 13a of the battery cover 13 is inserted into the bottom surface of the first case 1 located in the battery chamber 12, as shown in FIG. 3, the bottom face 13a of the battery cover 13 covers and closes the opening on the bottom surface side of the battery chamber 12, and the rear face 13b of the battery cover 13 covers and closes the opening on the rear surface side of the battery chamber 12, as shown in FIG. 2.

Figure 8:
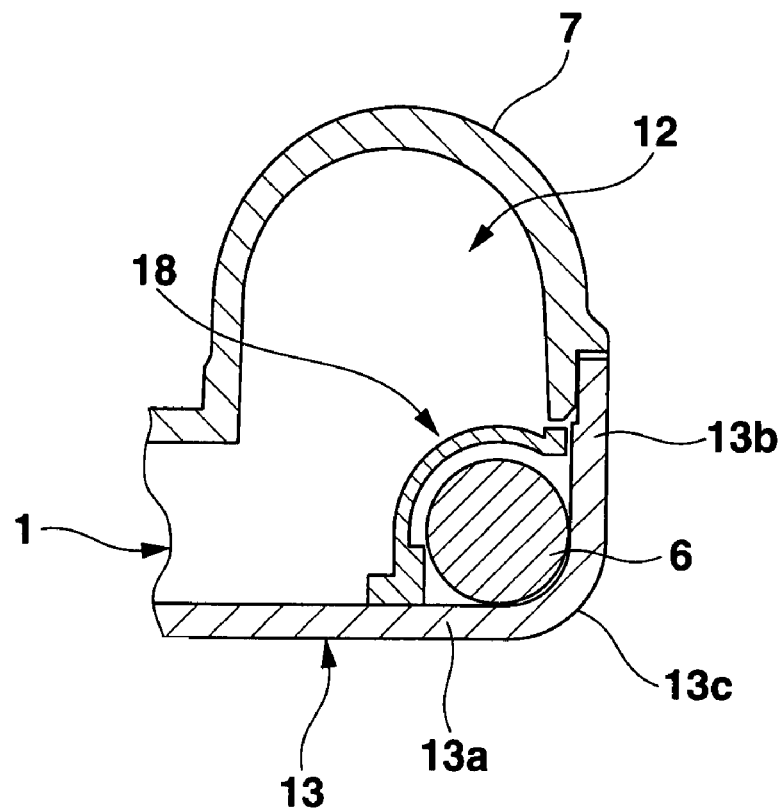
FIG. 8 is an enlarged cross-sectional view, taken in the direction of arrows along VIII-VIII line shown in FIG. 2, of essential portions.

As shown in FIG. 4, a stylus holder 18 is provided on an inner face of the battery cover 13. The stylus holder 18 accommodates the stylus 6 to be removable therefrom by drawing out the stylus 6 from the stylus holder 18. As shown in FIG. 8, the stylus holder 18 is formed substantially in a semicylindrical shape in correspondence with the inner face of the curved portion 13c in the battery cover 13, and is constructed such that its interior forms a substantially cylindrical space in cooperation with the curved portion 13c of the battery cover 13.

As shown in FIGS. 4-6, a first engaging portion 20 is provided on a first extending edge 18a that extends in a longitudinal direction of the stylus holder 18. Also, second engaging portions 21 are provided on a second extending edge 18b that extends in the longitudinal direction of the stylus holder 18. First retaining pieces 22 and second retaining pieces 23 are provided on the inner face of the battery cover 13 in such a manner as to correspond to the first engaging portion 20 and the second engaging portions 21 of the stylus holder 18, respectively.

As a result, when the stylus holder 18 is disposed slightly on the left of the inner face of the curved portion 13c of the battery cover, as shown in FIG. 6, the first engaging portion 20 of the stylus holder 18 is slidably engaged with the first retaining pieces 22 of the battery cover 13. In the state, if the stylus holder 18 is slid toward the right side, the second engaging portions 21 of the stylus holder 18 are retained by the second retaining pieces 23 of the battery cover 13, thereby attaching the stylus holder 18 to the battery cover 13.

When the battery cover 13 is fitted to the battery chamber 12, both end portions of the stylus holder 18 are closed by closure portions 24 and 25 provided on both end portions of the battery chamber 12, as shown in FIGS. 2 and 3. The closure portions 24 and 25 are respectively provided at the both end portions of the battery chamber 12. A stylus insertion portion 26 for guiding the stylus 6 into the stylus holder 18 is provided in the closure portion 24 located at one end portion (the left end portion in FIG. 3) of the stylus holder 18, as shown in FIGS. 3 and 7.

Figure 7:
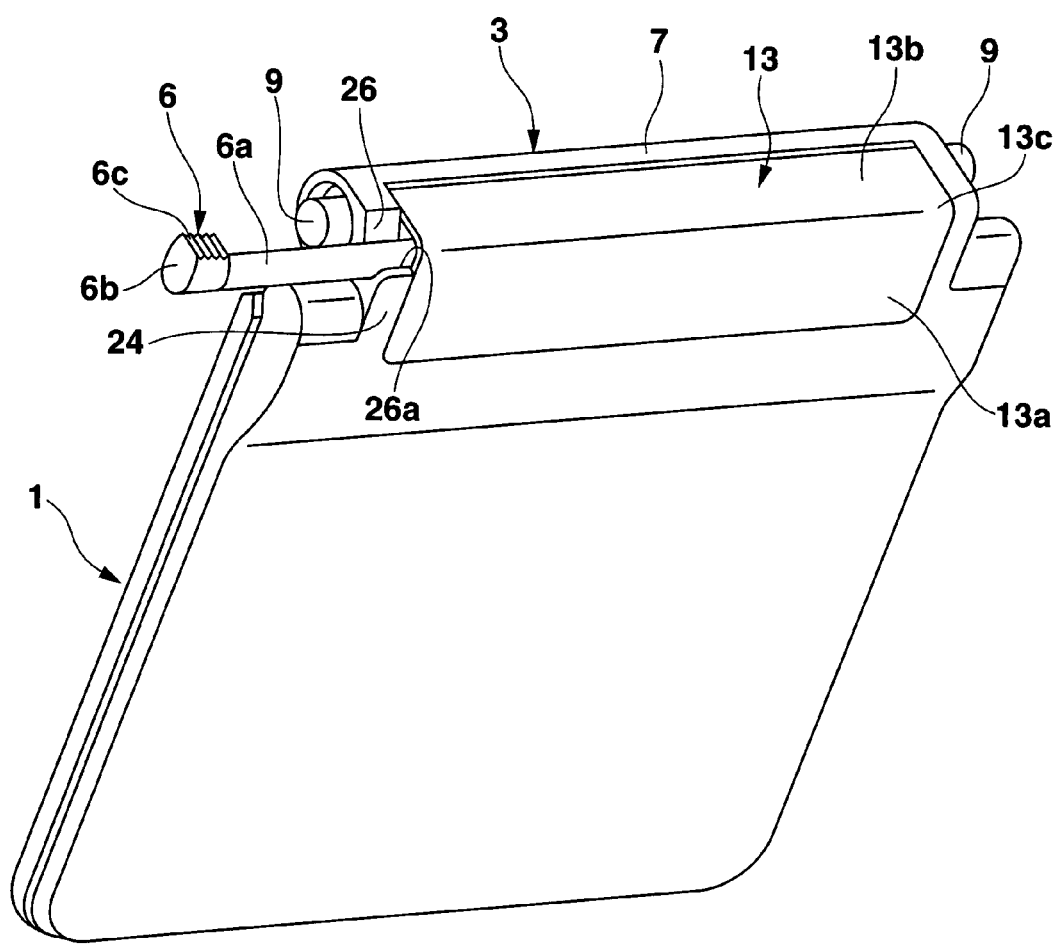
FIG. 7 is a perspective view of the lower surface side of the first case and illustrates a state in which the stylus is drawn out midway in the state shown in FIG. 3.

A stylus body 6a of the stylus 6 is formed into a round rod shape, and a leading end of the stylus body 6a is formed in a tapered conical shape, while a head 6b provided at other end of the stylus body 6a is formed into the shape of a substantially semielliptical cylinder shape (a shape in which a part of peripheral surface of an elliptical cylinder being cut away) larger than the stylus body 6a, as shown in FIG. 7. A corrugated groove portion 6c for slip prevention is provided on the head 6b. The stylus insertion portion 26 of the closure portion 24 is formed into the shape of a substantially semielliptical cylinder of the same size as the head 6b of the stylus 6, as shown in FIG. 3. When the stylus 6 is inserted in the stylus holder 18, the head 6b of the stylus 6 is fitted, thereby causing the stylus 6 not to rotate in the stylus holder 18.

As shown in FIG. 3, an opening 26a for exposing the head 6b of the stylus 6 in a state in which the head 6b is fitted is provided in the closure portion 24 where the stylus insertion portion 26 is provided. As a result, the battery cover 13 can be removed from the battery chamber 12 even with the stylus 6 accommodated in the stylus holder 18, as shown in FIG. 3.

According to the electronic device thus configured, since the battery cover 13 is detachably mounted to the battery chamber 12, and the stylus holder 18 for insertably and removably accommodating the stylus 6 is provided on the inner face of the battery cover 13, the battery chamber 12 and the stylus holder 18 for accommodating the stylus 6 need not be provided at separate portions, and the mounting density in the hinge portion 3 can be enhanced. Furthermore, even if the stylus holder 18 for accommodating the stylus 6 is provided, the overall apparatus can be made sufficiently compact without impairing the external appearance of the overall device.

In addition, even in the state in which the stylus 6 is accommodated in the stylus holder 18, the battery cover 13 can be easily removed from the battery chamber 12, and since the stylus 6 is not lost at the time of the battery replacement, it is possible to provide an easy-to-use device.

Figure 9:
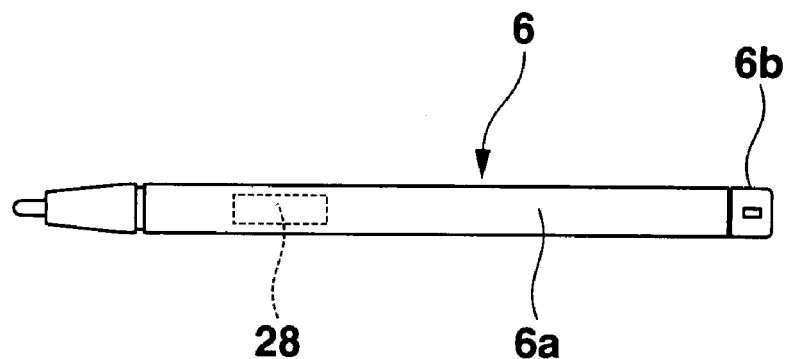
FIG. 9 is a diagram illustrating a modification of the stylus in accordance with the invention.
Figure 10:
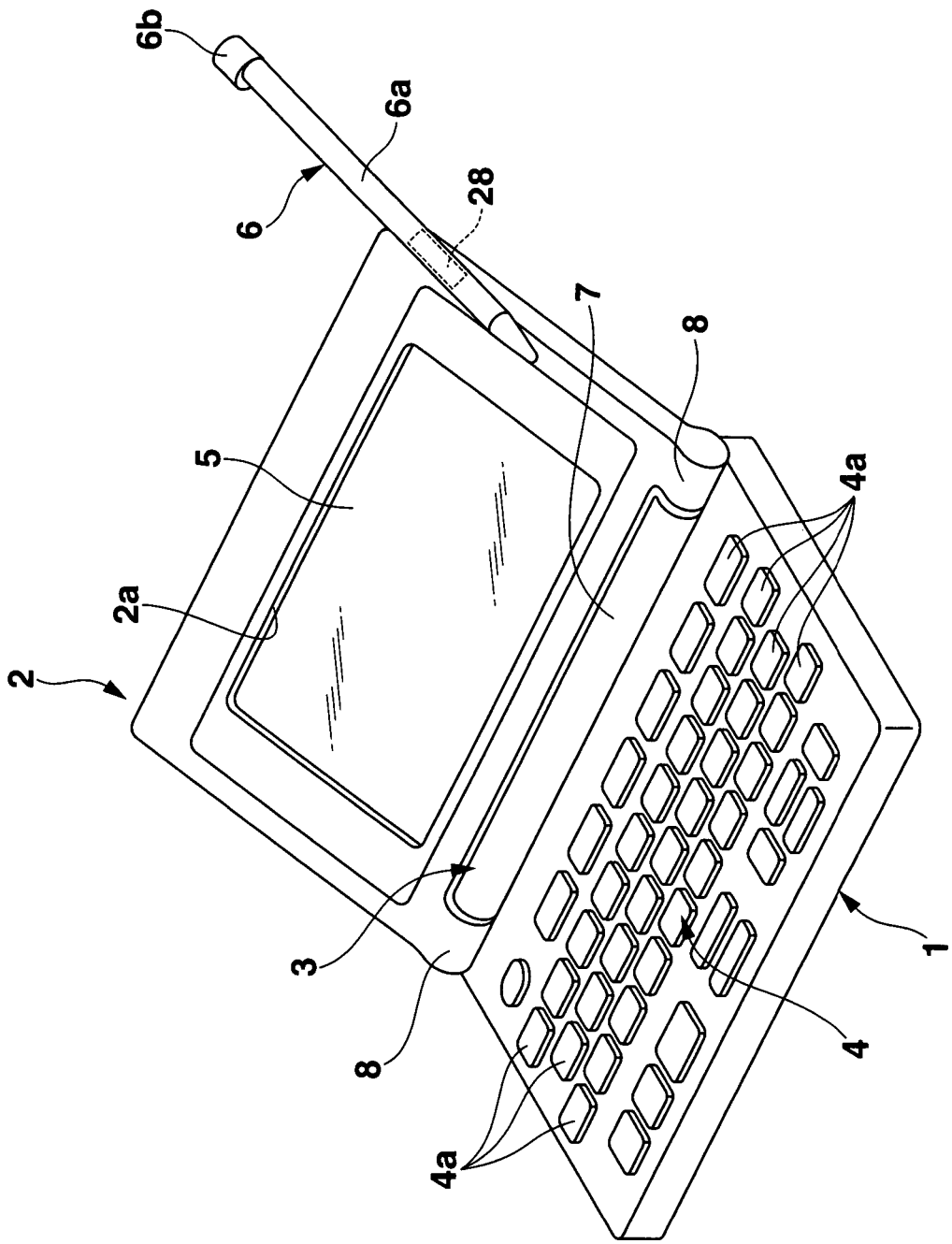
FIG. 10 is a perspective view of an electronic dictionary and illustrates a state in which the stylus shown in FIG. 9 is attracted to and held on the second case by means of a magnet.

It should be noted that although in the above-described embodiment a description has been given of the case in which the stylus 6 is merely accommodated in the stylus holder 18 inside the battery chamber 12, the present invention is not limited to the same. For example, the electronic device may be configured such that, as shown in FIGS. 9 and 10, a magnet 28 is provided inside the stylus 6 to allow the stylus 6 to be attached to a reinforcing metal frame (not shown) provided in the second case 2. In a case where the magnet 28 is provided, when the stylus 6 is used and an input is made in the key input section 4, the stylus 6 can be simply and easily kept attracted to the surface of the second case 2 even if the stylus 6 is not accommodated in the stylus holder 18 on each such occasion, so that ease of use improves further.

In the above-described embodiment a description, the head 6b of the stylus 6 is formed into the shape of a substantially semielliptical cylinder. However, the head 6b of the stylus 6 may be formed into a polygonal shape such as a triangular shape, a quadrangular shape, and a pentagonal shape or an elliptical shape larger than the outside diameter of the stylus body 6a. The head 6b of the stylus 6 should be formed into a noncircular shape other than a circular shape, which is larger than the outside diameter of the stylus body 6a. When thus configured, when the stylus 6 is accommodated in the stylus holder 18 and the head 6b of the stylus 6 is fitted in the stylus insertion portion 26, the stylus 6 can be accommodated so as not to freely rotate in the stylus holder 18 in the same way as in the above-described embodiment.

Figure 11:
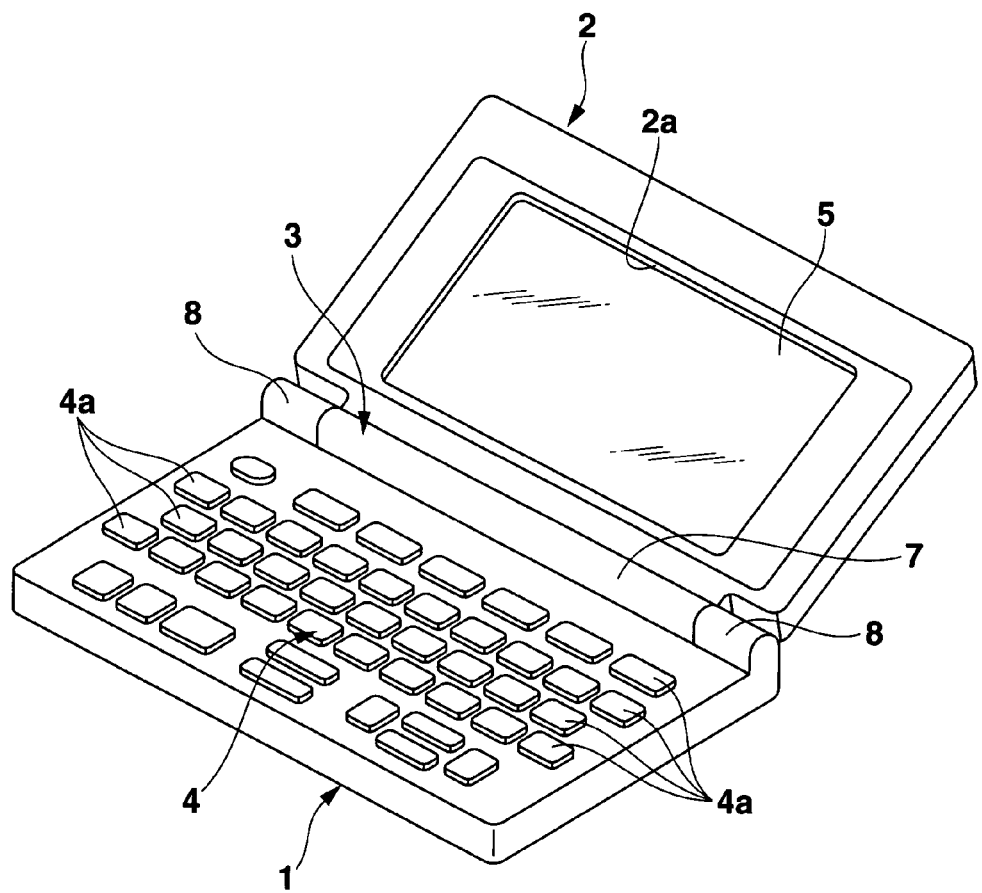
FIG. 11 is a perspective view illustrating a modification in which the invention is applied to an electronic dictionary.

The hinge portion 3 may be configured that, as shown in FIG. 11, the second hinge portions 8 are respectively provided on both sides of the end portion located on the rear surface side of the first case 1, the first hinge portion 7 is provided in an intermediately portion of the end portion of the second case 2 corresponding thereto, and the first and second hinge portions 7 and 8 are rotatably coupled by the hinge shafts 9. According to this configuration, it suffices if the battery chamber 12, the battery cover 13, and the stylus holder 18 are provided at the portion corresponding to the first hinge portion 7 of the second case 2. Also, by such configuration, it is possible to obtain an operational effect similar to that of the above-described embodiment.

Although in the above-described embodiment a description has been given of the case where the present invention is applied to an electronic dictionary, the device may not necessarily be an electronic dictionary, and the invention can be extensively applied to various electronic devices of the clamshell type, such as an electronic notebook, an electronic calculator, a mobile telephone, and a personal digital assistant (PDA).

What is claimed is:

1. A clamshell type electronic device comprising:
   a first case;
   a second case;
   a hinge portion that rotatably couples the first case and the second case to be foldable;
   a battery chamber that is provided in the hinge portion for accommodating a battery;
   a battery cover that covers the battery chamber; and
   a stylus holder that is provided on an inner face of the battery cover for accommodating a stylus to be removable therefrom by drawing out the stylus from the stylus holder.

2. The device according to claim 1, wherein the hinge portion has an opening that allows the stylus to be drawn out while the battery cover is being closed.

3. The device according to claim 1, wherein the battery chamber is opened toward a bottom side and a rear side of the device,
   wherein the battery cover has:
      a bottom face that covers the battery chamber at the bottom side of the device;
      a rear face that covers the battery chamber at the rear side of the device; and
      a curved portion that monolithically connects the bottom face and the rear face, and
   wherein the stylus holder is formed in a semicylindrical shape to form a cylindrical space with the curved portion of the battery cover.

4. The device according to claim 3, wherein the stylus holder has:
   a first engaging portion that is provided on a first extending edge that extends in a longitudinal direction of the stylus holder; and
   a second engaging portion that is provided on a second extending edge that extends in the longitudinal direction, and
   wherein the battery cover has:
      a first retaining piece that is formed on the inner face and retains the first engaging portion to be slidable in the longitudinal direction; and
      a second retaining piece that is formed on the inner face and retains the second engaging portion when the stylus holder is slid to a predetermined position.

5. The device according to claim 1, wherein the battery chamber is provided with a pair of closure portions at both end portions thereof for closing both ends of the battery cover, and
   wherein one of the closure portions is formed with a stylus insertion portion that guides the stylus into the stylus holder, the stylus insertion portion having a shape corresponding to a head of the stylus, which is formed in a noncircular shape and exposed outside of the stylus holder when the stylus is accommodated in the stylus holder.

6. The device according to claim 5, wherein one of the closure portions that is provided with the stylus insertion portion is formed with an opening that exposes the head of the stylus toward rear side of the device.

* * * * *